Jan. 12, 1932.  J. W. MYERS  1,841,049
MEANS FOR MARKING NEGATIVE FILMS
Filed Dec. 13, 1928  3 Sheets-Sheet 1
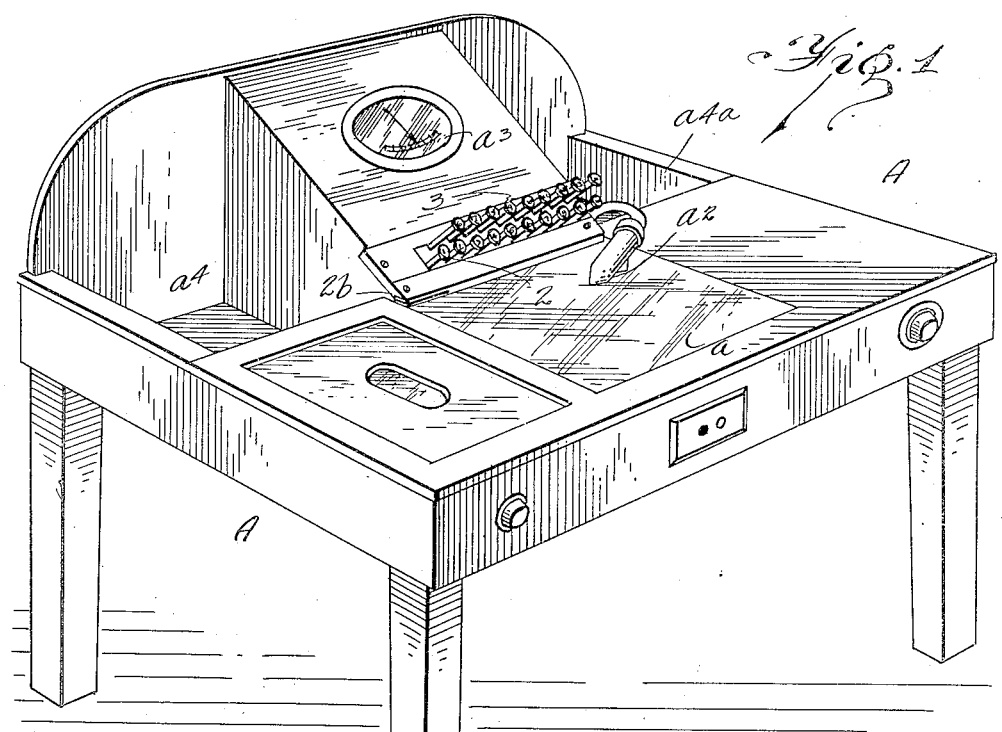
Fig. 1
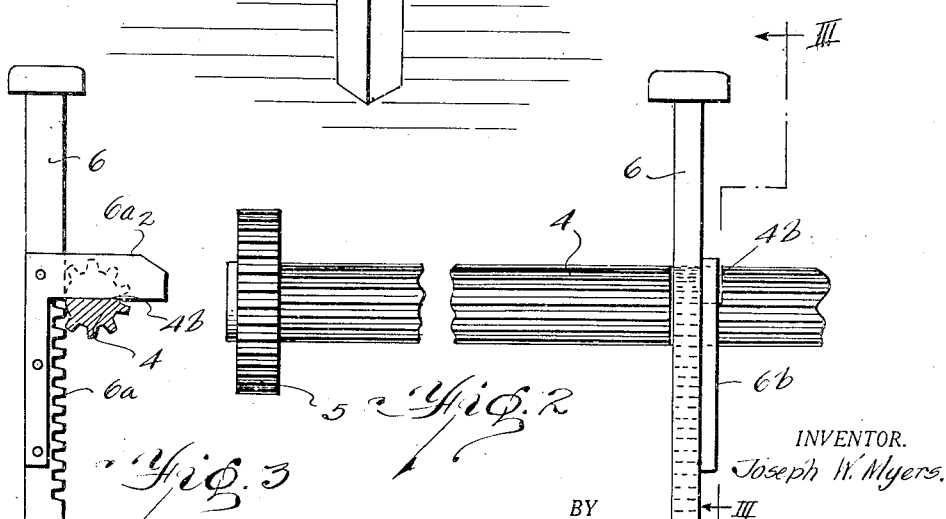
Fig. 2
Fig. 3
INVENTOR.
Joseph W. Myers.
BY
ATTORNEY.

Jan. 12, 1932. J. W. MYERS 1,841,049
MEANS FOR MARKING NEGATIVE FILMS
Filed Dec. 13, 1928   3 Sheets-Sheet 3

INVENTOR.
Joseph W. Myers.
BY Elliott Stoddard
ATTORNEY.

Patented Jan. 12, 1932

1,841,049

UNITED STATES PATENT OFFICE

JOSEPH W. MYERS, OF JACKSON, MICHIGAN

MEANS FOR MARKING NEGATIVE FILMS

Application filed December 13, 1928. Serial No. 325,720.

My invention relates to means for marking negative films to indicate the proper exposure and grade of paper to be used in making a print.

In my pending application filed December 19, 1927, Serial Number 241,031, I have shown that the printing time of a negative is a function of its minimum density within the interests of the picture and that the proper grade of paper to be used in making a print is indicated by the difference between the maximum and minimum densities, or "contrast", that exists within the interest of the picture. In my pending application filed April 19, 1928, Serial Number 271,137 I disclose a process and apparatus for preparing negatives for printing that is closely associated in its subject matter with this application.

I have, however, found two exceptions to the rule as to contrasts, that is to say: If changes in density from clear film to maximum density, as commercially encountered, is divided roughly into sixteen equal steps it will be found that when the maximum density does not exceed 6 the negative should always be printed on number four paper, where the paper is graded like Velox paper, of which there are four grades in use.

If the maximum density of the negative is 7 the negative should be printed on number three paper.

Aside from these exceptions I have found that negatives with 1, 2 and 3 degrees of contrast go on number four paper, with 4 and 5 degrees of contrast they go on number three paper, with 5, 6 and 7 degrees of contrast they go on number two paper and with 9 or more degrees of contrast they go on number one paper.

The apparatus embodying by present invention marks the negative, according to the above described system, to indicate the time of exposure to correspond to an observation of the minimum density and also marks the negative to indicate the grade of paper to correspond to the observation of the difference between the minimum and maximum density of the picture, or its contrast.

The time factor and proper grade of paper being thus marked the negative may be correctly printed by an unskilled workman.

In the accompanying drawings:

Figure 1 is a perspective view of the apparatus embodying my invention and that of the apparatus in connection with which it is used.

Figure 2 is a detail elevation of the resetting mechanism.

Figure 3 is a detail sectional view on the line III, III, Figure 2, looking in the direction of the arrows.

Figure 4:
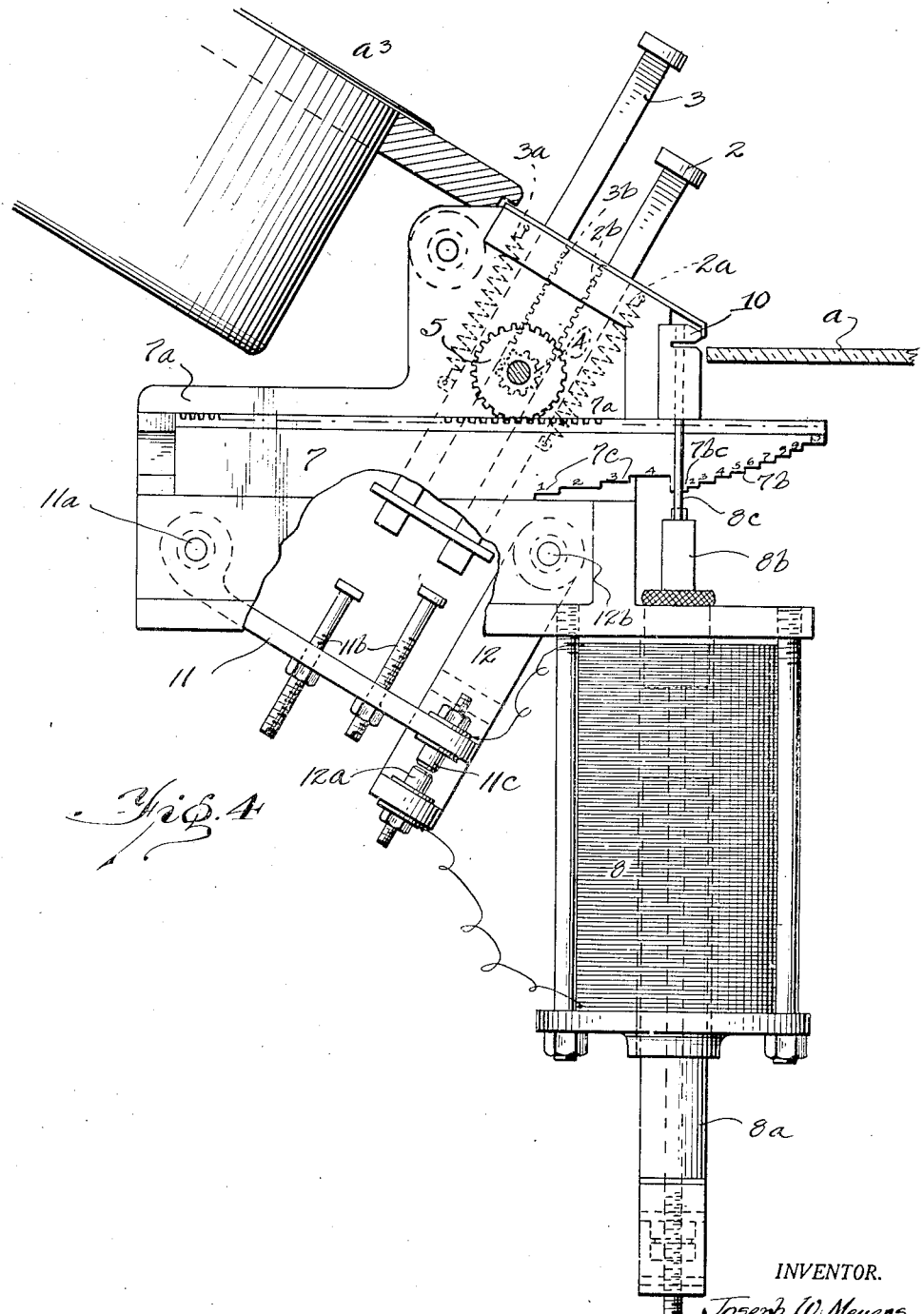
Figure 4 is a side elevational view of the apparatus embodying my invention, to a larger scale. A portion of the apparatus with which it is used is also indicated.

Referring to Figure 1, A indicates a densitometer apparatus as a whole, of which $a$ is the translucent plate upon which the negative is laid to have its significant points observed as to their permeability to a light ray. For this purpose the negative is moved until the required point comes beneath an opening in the casing of the sensitive cell $a2$ into which a ray of light is directed from beneath the plate $a$. The permeability of the negative at this point is indicated by the deflection of the needle of the galvanometer $a3$.

2 is a series, or bank, of keys each of which is adapted to cause the actuation of the apparatus hereinafter described to mark the negative with a character indicating the minimum permeability of the picture, and 3 is a parallel and similar series, or bank, of keys, each of which is adapted to cause the actuation of said apparatus to mark the negative to indicate the grade of paper to be used.

The negative is placed upon the translucent plate $a$ with its point of minimum density under the opening to the light sensitive cell $a2$ and the reading of the needle is observed at $a3$ and that one of the keys 2 is depressed that corresponds to the indication of the needle. The negative is then moved to a position where the point of maximum density of the interest of the picture is under the opening a2 and the reading indicated by the needle of the galvanometer at a3 is again observed and that one of the keys 3 is depressed, which corresponds to the deflection of the galvanometer. Before a key 2 or 3 is depressed the negative is moved to a position to be marked.

The negatives which are to be marked may be placed upon the table, or platform, at a4 and those which have been marked may be placed in the corresponding position at a4a.

The marking apparatus, including the keys 2 and 3, is described as follows:—

4 is a toothed cylinder, or pinion-rod, extending transversely across the machine.

Each of the keys 2 is provided with a retracting spring 2a and with a rack, or series of teeth 2b that normally is above the cylinder 4, but when the key is depressed said teeth engage the teeth of said cylinder to turn the same a prescribed distance.

Each of the keys 3 is provided with a spring 3a and a rack, or series of teeth 3b, corresponding to the spring and rack 2a and 2b of the keys 2.

5 is a gear wheel concentric with and located upon the cylinder, or pinion-rod 4 at the left hand end thereof.

7 is a slide-stop-bar having a rack, or series of teeth, 7a along its upper edge adapted to engage the teeth of the gear wheels 5, said bar reciprocates horizontally in stationary guides in the plane of the gear wheel 5.

The bar 7 is cut to different widths, vertically, towards its right hand end to form two series of steps, 7b and 7c. The first named series of steps ascending toward the right and the second descending toward the left of a point 7bc, at the lower edge of said bar.

8 is a solenoid. 8a is the plunger therein and 8b is a punch carrier at the upper end of the plunger 8a. 8c is a series of punches of uniformly increasing length, from the left to right, which punches are fixed and rise from the carrier 8b.

The upward movement of the punch carrier 8b is limited by striking against the lower edge of the bar 7. At the normal position of the bar 7 the point 7bc of said bar comes above the punch carrier 8b and limits its upward motion. As the bar 7 is moved toward the left the different horizontal portions of the steps 7b come above the carrier 8b and limits its upward motion to a distance depending upon the distance the bar 7 has been moved toward the left from the normal position at which the point 7bc is above the punch carrier.

If said bar is moved to the right the different horizontal portions of the steps 7c come above the punch carrier and limit its motion, depending upon the distance that the bar has moved toward the right from the position at which the point 7bc is vertically above the punch carrier 8b.

Figures 5, 6:
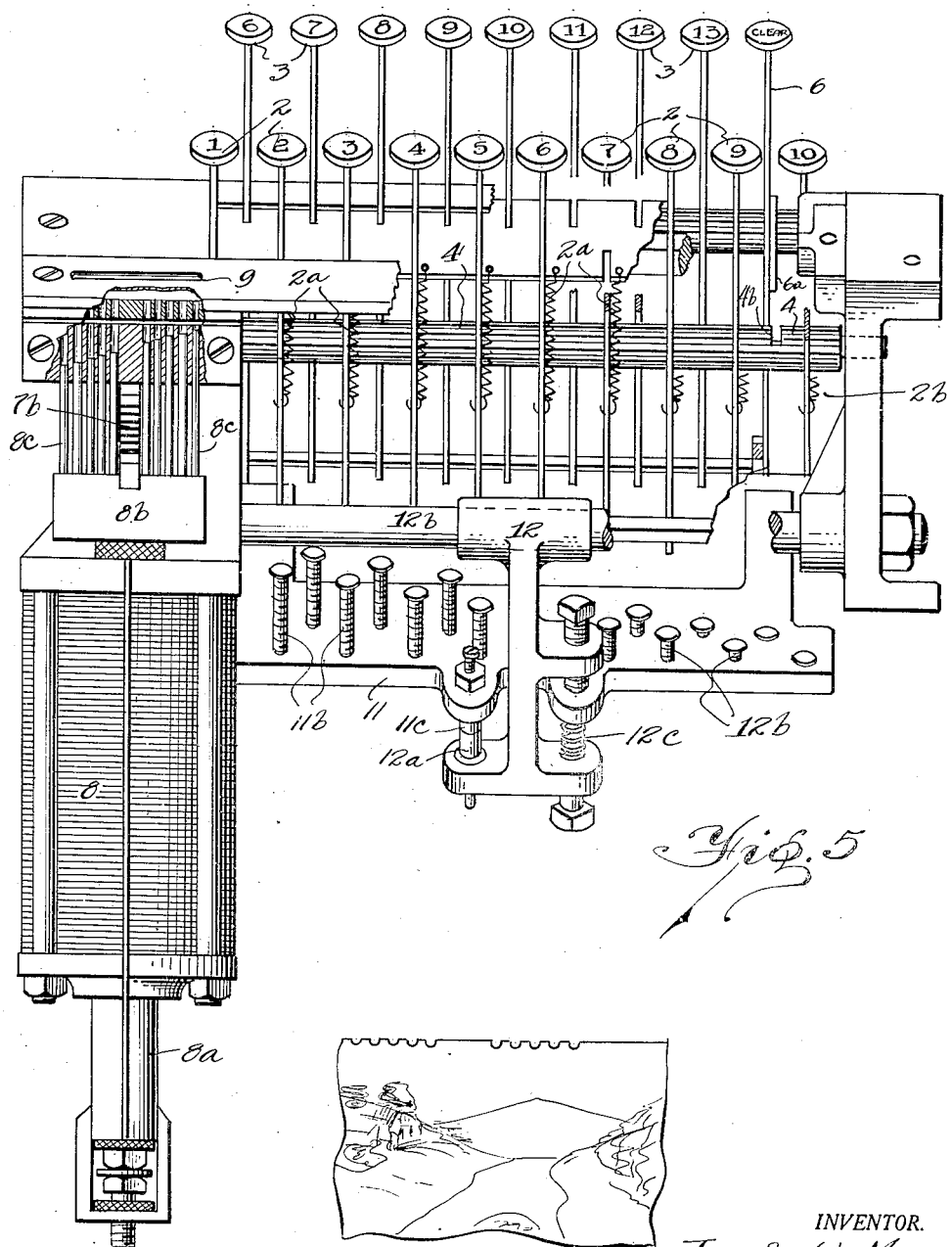
Figure 5 is a front elevation of the apparatus embodying my invention, portions being broken away to more clearly show its construction.
Figure 6 is a plan view of the marked negative.

11 is a plate extending transversely across the apparatus below the keys 2 and 3 and pivoted at its left hand edge at 11a. 11b are stop rods adjustably fixed to the plate 11 and extending upward from its upper surface, in line with the various keys 2 and 3. 12 is a bracket fixed upon a stationary crosspiece 12b and provided with a contact point 12a. 11c is a contact point on the plate 11 adapted to cooperate with the contact point 12a. 12c (Fig. 5) is a spring by which the plate 11 is normally held at its upper position with the contact point 11c out of engagement with the contact point 12a.

The operation of the above described apparatus is as follows:

When a key 2 is depressed its teeth 2b engage the pinion-rod 4 and rotate said rod until the lower end of the key strikes against the rod 11b, which oscillates the plate 11 and brings the contact point 11c into engagement with the point 12a, at which position the motion of the key 2 is stopped. The rotation of the pinion-rod 4 turns the gear wheel 5 and moves the bar 7 to the left, a distance proportional to the amount said rod and wheel has turned and to the distance the key has been depressed, bringing the step of the series 7b corresponding to the key 2 that has been depressed, above the punch carrier 8b. The closing of the circuit at 11c, 12a, energizes the solenoid 8 and projects the plunger 8a upward to raise the punch carrier 8b. By this action the number of punches 8c corresponding to the depressed key 2 is projected through the slots 9 (Fig. 5) and cut notches (Fig. 6) in the edge of the negative, which has been placed with its edges above said slot and beneath the holder 10 (Fig. 4).

The depression of a key 3 causes a rack 3b to engage the other side of the pinion-rod 4 and turn said rod in the opposite direction, until the depressed key 3 meets a rod 11b and depresses the plate 11 to complete the circuit through the solenoid, as described in connection with the key 2, the previous contact having been broken by the reverse motion of the plate 11 due to the spring 12c.

The negative has been placed with a new portion of its edge above the slot 9 and a series of notches is therefore cut in its edge.

The retracting spring 2a is too weak to move its key 2 and the bar 7 so that when a key 2 is depressed the parts stay in their adjusted position until actuated by the key 3, but the springs 3a are sufficiently strong so that when a key 3 is released it is raised by its respective spring 3a and turns the pinion-rod 4 and wheel 5, bringing the stop bar 7 back to its previous position.

At the right of the bank of keys 3 is a clearance key 6 by which the pinion-rod 4 is brought accurately to its normal position.

For this purpose the rod 4 is slotted as shown at 4b (Figs. 2 and 3) and the key 6 is provided with an arm 6a2 which engages the bottom of the slot 4b, as shown in Fig. 3, to accurately fix the position of the pinion-rod. The rack teeth 6a engaging the teeth of the pinion-rod when the key 6 is depressed, carrying said rod to a position at which it can be so acted upon by the projection 6a2.

The two exceptions of the rule relating to maximum density reading of 6 or 7 are provided for by making the 6 key of the bank of keys 3 only retract the slide bar three positions, thus in practice it can never get past the point on the slide bar that will indicate number four paper. The 7 key of said bank is only permitted to move the slide bar five positions, thus making it practically impossible for number two paper to ever be indicated and putting the negative on either three or four paper, where it has been found to belong.

It will be noticed that a key of the bank of keys 3 acts upon the rod 4 to turn the same in the opposite direction to that in which a key of the bank 2 has turned it and therefore the position to which the slide bar 7 is carried to the right of its normal position by the key 3 is equal to the difference between the movement of the pinion-rod 4 by the key 3 and its movement by the key 2 and this corresponds to the grade of paper and the latter mark therefore indicates the paper to be used.

It may be observed that the 11, 12 and 13 keys are each permitted to advance the bar 2 positions further than the preceding key, instead of one position as might be expected.

Whereas the system of densities is composed of sixteen steps from clear film to maximum density, it has been found that after ten steps have been passed it is practical in making a reading to proceed in larger steps and thus eliminate three keys and three numbers from the dial of the densitometer. There are only thirteen numbers on the densitometer instead of sixteen, but the enlarged magnitude of the steps after ten is taken into consideration in the marking machine and the slide stop bar is caused to move two extra positions for the 11, 12 and 13 key.

What I claim is:

1. In an apparatus of the kind described, a movable part adapted to mark a negative in proportion to the extent of travel of said part and means for limiting the travel of said part to a predetermined extent.

2. In an apparatus for marking negatives a movable part carrying a series of punches of progressively increasing length, a negative supporting and cutting surface in the line of travel of said punches and means for limiting the travel of said part at the will of the operator to a predetermined extent whereby the desired number of punches shall cut the negative when in place.

3. In an apparatus of the kind described, a movable part adapted to mark a negative in accord with the extent of travel of said part, a second movable part of varying dimensions interposed in the line of travel of the first named part, and means for actuating said interposed part to present different dimensions in the line of travel of the first named part to limit the extent of travel of the same.

4. In an apparatus of the kind described, a movable part adapted to mark a negative in accord with the extent of travel of said part, a second movable part of varying dimensions interposed in the line of travel of the first named part, means for adjusting said interposed part in one direction to present different dimensions in the line of travel of the first named part, means for adjusting said interposed part to a greater extent in the other direction to interpose suitable dimensions in the line of travel of the first named part, said adjusting parts being adapted to act successively to adjust the interposed part to the difference between its two adjustments.

5. In an apparatus of the kind described, a movable part adapted to mark a negative in accord with the extent of travel of said part, a second movable part of varying dimensions interposed in the line of travel of the first named part, means for adjusting said interposed part in one direction to present different dimensions in the line of travel of the first named part, means for adjusting said interposed part to a greater extent in the other direction to interpose suitable dimensions in the line of travel of the first named part, the marks determined by the first adjustment indicating values and those determined by the second adjustment indicating differences between values.

6. In an apparatus of the kind described, the combination of a marking part, a rod adapted to control the operation of said marking part by the extent of its rotation, a series of keys adapted to rotate said rod to different extents and means whereby said marking part is actuated when a key is depressed.

7. In an apparatus of the kind described, the combination of a marking part, a rod adapted to control the operation of said marking part by the extent of its rotation, a series of keys acting on one side of said rod to rotate the same to different extents in one direction, a series of keys acting on the other side of said rod to rotate the same in the opposite direction, and means for actuating said marking part when a key is depressed.

8. In an apparatus of the kind described, the combination of a marking part, a toothed pinion-rod adapted to control the operation of said marking part by the extent of its rotation, a series of keys each having a tooth rack adapted to engage the teeth of said pinion-rod and means whereby said marking part is actuated when a key is depressed.

9. In an apparatus of the kind described, the combination of a part adapted to mark a negative in proportion to the extent of travel of said part, means for limiting the extent of travel of said marking part to correspond to the extent of travel of said limiting means, and means for actuating said limiting means to a predetermined extent.

10. In an apparatus of the kind described, the combination of a part adapted to mark a negative in proportion to the extent of travel of said part, means for limiting the extent of travel of said marking part to correspond to the extent of travel of said limiting means, and means for actuating said limiting means to predetermined extents successively and in opposite directions.

11. An apparatus for perforating to mark a film negative consisting of an integral series of punches of progressive lengths, a cooperating die block adapted to receive the edge of the negative, means for advancing said punches into said dies and for selectively stopping said punches after a desired number of punches have entered their cooperating dies and perforated the negative to the desired extent.

12. The combination of a series of punches having their cutting edges located successively at different positions in their line of travel, means for actuating said punches as a unit on their cutting stroke, a series of keys each adapted to limit the travel of said punches to a definite extent and a jig, adapted to receive a negative determining the cutting position of said punches in a line transverse to the stroke of said punches, for the purpose described.

13. In an apparatus for marking negatives in which a densitometer is used to measure the translucency of points of the negative, an apparatus having an adjusting part movable successively, in one direction to correspond with one reading of the densitometer, and in the opposite direction to correspond to another reading of the densitometer, said apparatus being provided with a marker connected to said adjusting part adapted to mark the negative with a distinctive mark at the end of the second of said successive movements for the purpose described.

14. In an apparatus for marking negatives in which a densitometer is used to measure the translucency of points of the negative, an apparatus having an adjusting part movable successively, in one direction to correspond to the reading of the densitometer at a point of the negative of minimum density, and in the opposite direction to correspond to the reading of the densitometer at a point of the negative of maximum density, said apparatus being provided with a marker connected to said adjusting part adapted to mark the negative with a distinctive mark at the end of the second of said successive movements for the purpose described.

15. The combination of a series of punches having their cutting edges located successively at different positions in their line of travel, means for actuating said punches as a unit on their cutting stroke, a series of keys each adapted to limit the travel of said punches to a definite extent and then to cause the actuation of said punches and a jig determining the cutting position of said punches in a line transverse to the stroke of said punches, for the purpose described.

In testimony whereof, I sign this specification.

JOSEPH W. MYERS.